United States Patent
Kim et al.

(10) Patent No.: US 12,124,287 B2
(45) Date of Patent: Oct. 22, 2024

(54) PEDAL APPARATUS FOR VEHICLE

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-Si (KR); Kyung Nam Kim, Daegu (KR); Dae Yeon Kim, Daegu (KR); Hyeon Uk Kim, Daegu (KR)

(73) Assignees: Hyundai Motor Company, Seoul (KR); Kia Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 18/135,583

(22) Filed: Apr. 17, 2023

(65) Prior Publication Data
US 2023/0367355 A1    Nov. 16, 2023

(30) Foreign Application Priority Data

Dec. 5, 2022 (KR) .......................... 10-2022-0167908

(51) Int. Cl.
| G05G 1/40 | (2008.04) |
| B60N 3/06 | (2006.01) |
| G05G 1/44 | (2008.04) |
| G05G 5/05 | (2006.01) |
| G05G 25/02 | (2006.01) |

(52) U.S. Cl.
CPC ................. *G05G 1/40* (2013.01); *B60N 3/06* (2013.01); *G05G 1/44* (2013.01); *G05G 5/05* (2013.01); *G05G 25/02* (2013.01); *G05G 2505/00* (2013.01)

(58) Field of Classification Search
CPC .......................... G05G 25/02; G05G 2505/00
See application file for complete search history.

(56) References Cited

U.S. PATENT DOCUMENTS

| 8,656,805 | B2 | 2/2014 | Palacio Argüelles et al. |
| 8,794,102 | B2 * | 8/2014 | Heitkamp ................ G05G 1/44 |
| | | | 74/513 |
| 10,114,403 | B2 * | 10/2018 | Kadoi ..................... G05G 1/483 |
| 2012/0132028 | A1 * | 5/2012 | Kim ........................ G05G 1/405 |
| | | | 74/512 |

FOREIGN PATENT DOCUMENTS

| CN | 201424080 Y | 3/2010 | |
| CN | 214874754 U | 11/2021 | |
| KR | 20-1995-0017780 U | 7/1995 | |
| KR | 20-1997-0036251 U | 7/1997 | |
| KR | 10-0789438 | 12/2007 | |
| KR | 100789438 B1 * | 12/2007 | ............... B60T 7/06 |
| KR | 10-2021-0125733 | 10/2021 | |
| WO | WO2021/0234421 | 11/2021 | |

* cited by examiner

*Primary Examiner* — Vicky A Johnson
(74) *Attorney, Agent, or Firm* — Morgan, Lewis & Bockius LLP

(57) ABSTRACT

A pedal apparatus for a vehicle, includes a pedal pad rotatably coupled to an upper end portion of a foldable pedal arm so that a contact area may be increased when a driver's foot comes into contact with the pedal pad, which makes it possible to improve convenience and safety for the driver when the driver performs the pedal operation.

19 Claims, 14 Drawing Sheets

PEDAL APPARATUS FOR VEHICLE

CROSS REFERENCE TO RELATED APPLICATION

The present application claims priority to Korean Patent Application No. 10-2022-0167908, filed Dec. 5, 2022, the entire contents of which is incorporated herein for all purposes by this reference.

BACKGROUND OF THE PRESENT DISCLOSURE

Field of the Present Disclosure

The present disclosure relates to a pedal apparatus for a vehicle, and more particularly, to a technology associated with a pedal apparatus for a vehicle, in which a pedal pad is rotatably coupled to a pedal arm of an organ-type pedal.

Description of Related Art

In general, pedal apparatuses for a vehicle are classified, depending on mounting structures, into a pendant-type pedal apparatus and an organ-type pedal apparatus.

In the case of the pendant-type pedal apparatus, a rotation center of a pedal arm is disposed at an upper side of the pendant-type pedal apparatus, and a pedal pad is disposed at a lower side of the pendant-type pedal apparatus so that a driver operates the pendant-type pedal apparatus by pressing the pedal pad at the lower side or pushing the pedal pad forward by use of a front portion of the driver's foot. In the case of the organ-type pedal apparatus, a rotation center of a pedal arm is disposed at a lower side of the organ-type pedal apparatus, and a pedal pad is disposed at an upper side so that a driver operates the organ-type pedal apparatus by rotating the pedal arm forward by pressing the pedal pad at the upper side thereof.

Meanwhile, a pedal apparatus provided in an autonomous vehicle may be configured to switch between a pop-up state and a hidden state by operation of a foldable mechanism.

The foldable mechanism may include an actuator (motor) configured to generate power, and a gear member engaged to the actuator and the pedal arm.

In the pop-up state, the pedal apparatus protrudes toward the internal so that the driver may operate the pedal apparatus. In the instant case, the vehicle travels by being manually operated by the driver. In the hidden state, the pedal apparatus is hidden so that the driver cannot operate the pedal apparatus. In the instant case, the vehicle autonomously travels.

Because the pedal apparatus in the related art including the pedal arm and the pedal pad has a structure in which the pedal pad cannot rotate relative to the pedal arm, the driver operates the pedal apparatus by bringing the driver's foot into contact with only a portion of a rim side end portion of the pedal pad during a full stroke of the pedal arm made by the operation of the driver. For this reason, there is a problem in that discomfort is caused to the driver when the driver operates the pedal, and there is concern that the operation of the pedal is inadvertently stopped because of carelessness.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a pedal apparatus for a vehicle, which is a foldable organ pedal apparatus configured so that a pedal pad is rotatably coupled to a pedal arm, which makes it possible to increase a contact area when a driver's foot comes into contact with the pedal pad, improving convenience for the driver and improving safety when the driver performs a pedal operation.

Various aspects of the present disclosure are directed to providing a pedal apparatus for a vehicle, the pedal apparatus including: a pedal arm including an upper end portion configured to be rotatable forward or rearward about a hinge pin mounted at a lower end portion of the pedal arm; and a pedal pad rotatably coupled to the pedal arm.

The pedal apparatus may further include a foldable mechanism connected to the pedal arm, in which the pedal arm is configured to switch between a pop-up state, in which the pedal arm protrudes from a footrest panel by operation of the foldable mechanism, and a hidden state in which the pedal arm is inserted into the footrest panel.

The pedal apparatus may further include a connection pin disposed at the upper end portion of the pedal arm and connecting the pedal arm and the pedal pad, in which the pedal pad rotates forward or rearward about the connection pin relative to the pedal arm.

The pedal apparatus may further include a pad spring penetrated by the connection pin and including two opposite end portions supported and provided on the pedal arm and the pedal pad, the pad spring being configured to provide a spring force to rotate the pedal pad forward thereof.

The pedal apparatus may further include a damper coupled to a rear surface of the pedal pad and configured to prevent occurrence of noise by coming into contact with the pedal arm when the pedal pad rotates.

A protrusion portion may be provided on the rear surface of the pedal pad and penetrated by the connection pin, and upper and lower dampers may be coupled to upper and lower portions based on the protrusion portion.

The pedal apparatus may further include: a connection pin disposed at the upper end portion of the pedal arm and connecting the pedal arm and the pedal pad; a fixing member coupled to an end portion of the connection pin and configured to prevent withdrawal of the connection pin from the pedal arm and the pedal pad; and a pad cover coupled to the rear surface of the pedal pad to prevent the connection pin, the fixing member, and the damper from being exposed.

The pad cover may include a left cover and a right cover, the left and right covers may each have a cover protrusion, and the cover protrusion may be inserted into a coupling hole formed in the pedal pad so that the left and right covers are coupled to the rear surface of the pedal pad.

Two opposite end portions of the left cover and two opposite end portions of the right cover may be coupled to one another at upper and lower portions of the pad cover so that a connection structure is implemented in a state in which the left and right covers are coupled to the pedal pad.

An upper portion of the pad cover may be inclined downward toward first and second opposite sides thereof from a middle point thereof.

Upper and lower surfaces of the pedal arm and upper and lower portions of the pad cover may each have a curvature of an arc along a rotation radius of the pedal arm, the upper portion of the pad cover may have a smaller radius of curvature than the upper surface of the pedal arm, and the lower portion of the pad cover may have a larger radius of curvature than the lower surface of the pedal arm.

A width of the pad cover in a leftward and rightward direction may be smaller than a width of the pedal arm in the leftward and rightward direction, and left and right surfaces of the pad cover may be respectively positioned inwardly of left and right surfaces of the pedal arm.

In a state in which a driver's foot is not in contact with the pedal pad in a state in which the pedal arm is popped up, the pedal pad may be rotated forward by a spring force of the pad spring, the upper damper may be in contact with the pedal arm, and the lower damper may be kept spaced from the pedal arm.

In a response that a driver's foot comes into contact with the pedal pad in a state in which the pedal arm is popped up, the pedal pad may rotate rearward about the connection pin, and when the pedal pad maximally rotates rearward thereof, the lower damper may come into contact with the pedal arm, and the upper damper may be kept spaced from the pedal arm.

When the pedal pad, which is in contact with a driver's foot, rotates about the connection pin in a state in which the pedal arm is rotated forward with a full stroke, the lower damper may come into contact with the pedal arm, and the pedal pad may not come into contact with the footrest panel.

When the pedal arm is in a hidden state, a rear surface of the pedal pad may be in surface-contact with the footrest panel and block a hole in the footrest panel through which the pedal arm passes.

When the pedal arm is in a hidden state, the rear surface of the pedal pad may be in surface-contact with the footrest panel, and the lower damper may be spaced from the pedal arm.

The foldable mechanism may include: an actuator fixed on a pedal housing; and a gear member engaged to the actuator and the pedal arm.

The pedal apparatus for a vehicle according to an exemplary embodiment of the present disclosure is an organ-type pedal apparatus, in which the pedal pad is rotatably coupled to the upper end portion of the foldable pedal arm. Therefore, the contact area may be increased when the driver's foot comes into contact with the pedal pad, which makes it possible to improve convenience and safety for the driver when the driver performs the pedal operation.

Furthermore, according to the pedal apparatus for a vehicle according to an exemplary embodiment of the present disclosure, the pad cover may be coupled to the connection portion between the pedal arm and the pedal pad, and the pad cover may be used to cover the coupling components of the pedal arm and the pedal pad, which makes it possible to improve the external aesthetic appearance. It is possible to prevent the pad cover from causing the problem in that the pedal arm appears to be thin, which makes it possible to ensure a robust image of the external appearance.

Furthermore, according to the pedal apparatus for a vehicle according to an exemplary embodiment of the present disclosure, the upper portion of the pad cover is inclined downward toward the two opposite sides thereof from the middle point thereof. Therefore, it is possible to easily discharge foreign substances to the outside and thus prevent foreign substances from being introduced into the pedal housing.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
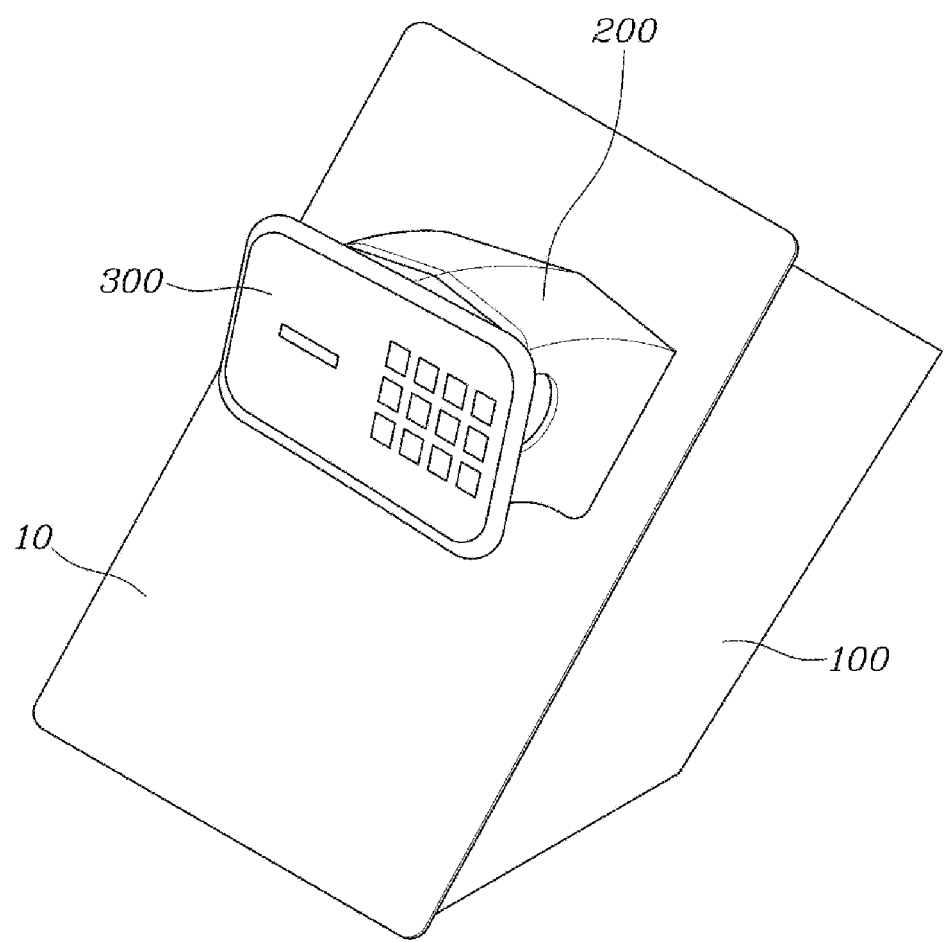
FIG. 1 is a view exemplarily illustrating a pop-up state of a pedal apparatus for a vehicle according to an exemplary embodiment of the present disclosure in which a pedal arm protrudes from a footrest panel.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification.

Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element may be coupled or directly connected to another constituent element, and an intervening constituent element can also be present between the constituent elements.

When one constituent element is described as being "directly coupled to" or "directly connected to" another constituent element, it may be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" included in the name of "motor control unit (MCU)" or "hybrid control unit (HCU)" is merely a term widely used to name a control device (controller or control unit) for controlling a vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, a pedal apparatus for a vehicle according to various exemplary embodiments of the present disclosure will be described with reference to the accompanying drawings.

The pedal apparatus for a vehicle according to an exemplary embodiment of the present disclosure is an organ-type pedal apparatus and has a foldable function.

That is, as illustrated in FIGS. 1 to 14, the pedal apparatus for a vehicle according to various exemplary embodiments of the present disclosure may include a pedal housing 100; a pedal arm 200 including an upper end portion configured to be rotatable forward or rearward about a hinge pin 210 disposed at a lower end portion of the pedal arm 200; and a pedal pad 300 rotatably coupled to the pedal arm 200.

The pedal pad 300 is rotatably coupled to an upper end portion of a rear surface of the pedal arm 200 which is directed toward a driver. Therefore, when the driver's foot comes into contact with the pedal pad 300, the pedal pad 300 rotates about a connection pin 400 so that a contact area between the pedal pad 300 and the driver's foot may increase, which makes it possible to improve convenience and safety for the driver when the driver performs the pedal operation.

The upper end portion of the pedal arm 200 and the pedal pad 300 are coupled by the connection pin 400. Therefore, the pedal pad 300 is structured to rotate forward or rearward about the connection pin 400 relative to the pedal arm 200.

A fixing member 410 is coupled to an end portion of the connection pin 400 and prevents withdrawal of the connection pin 400.

The fixing member 410 may be configured as, but not limited to, a clip, a pin, a nut, and the like.

Figure 3:
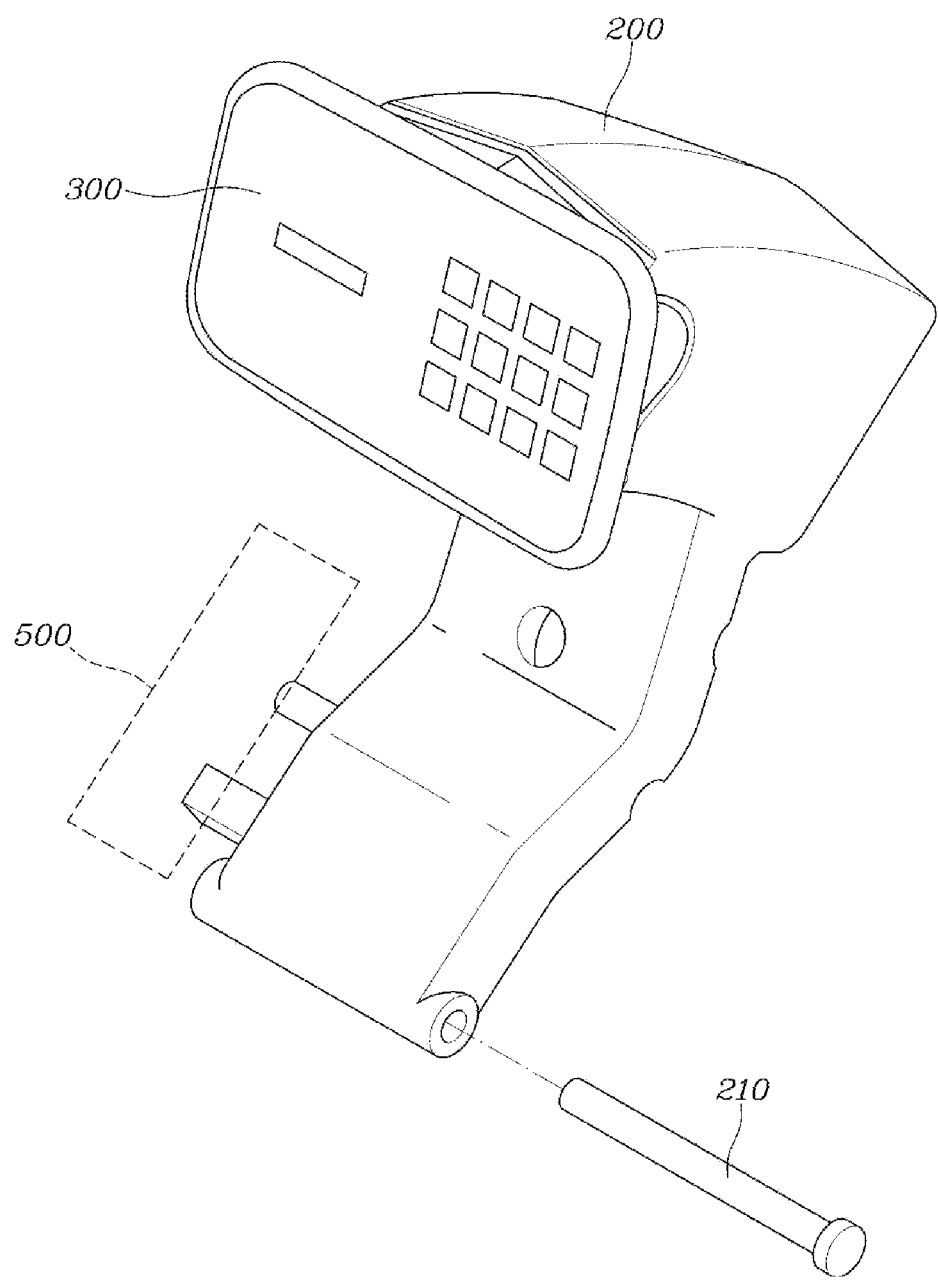
FIG. 3 is a view exemplarily illustrating a coupled state of the pedal apparatus according to an exemplary embodiment of the present disclosure.
Figure 4:
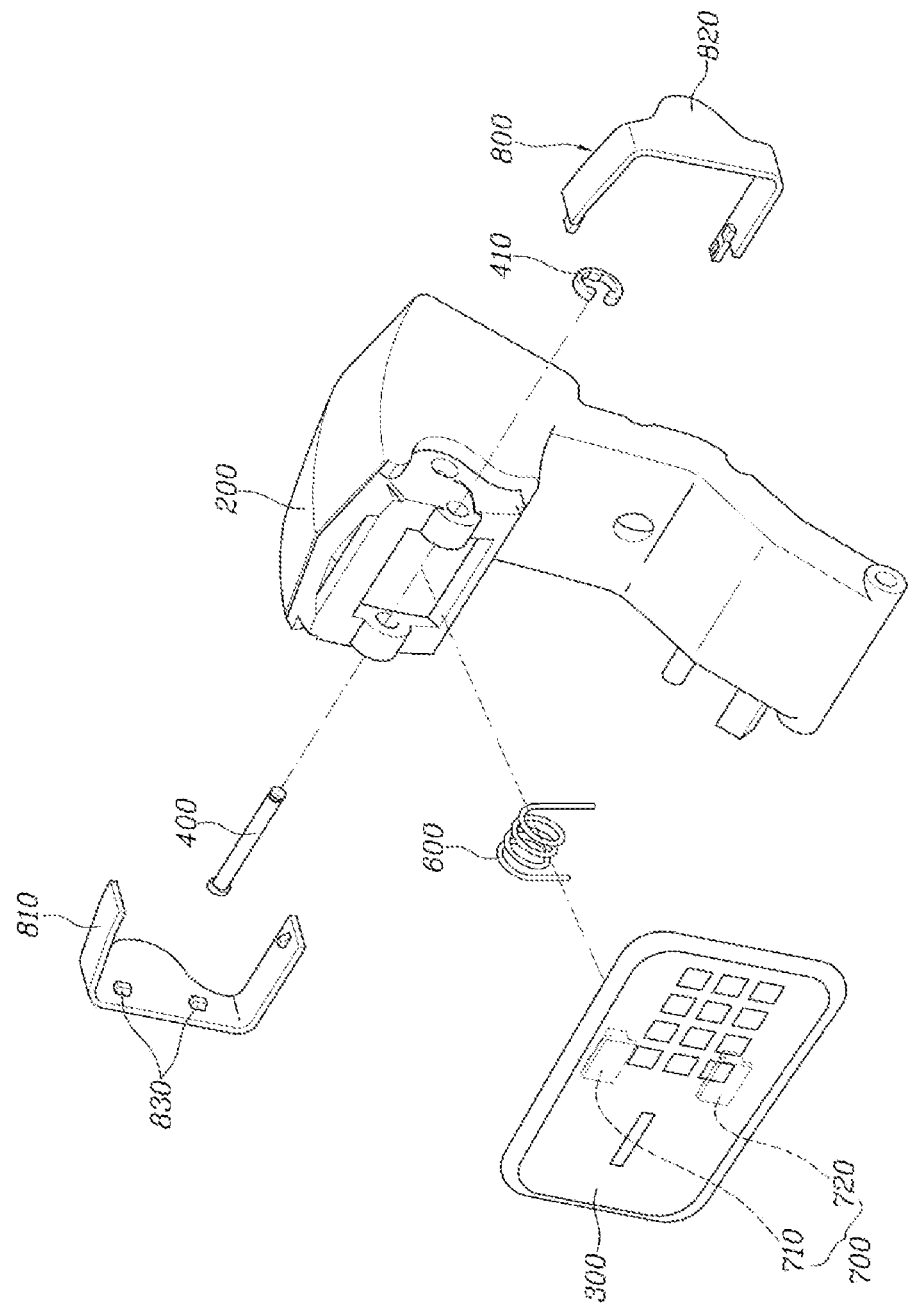
FIG. 4 is an exploded view of FIG. 3.
Figure 5:
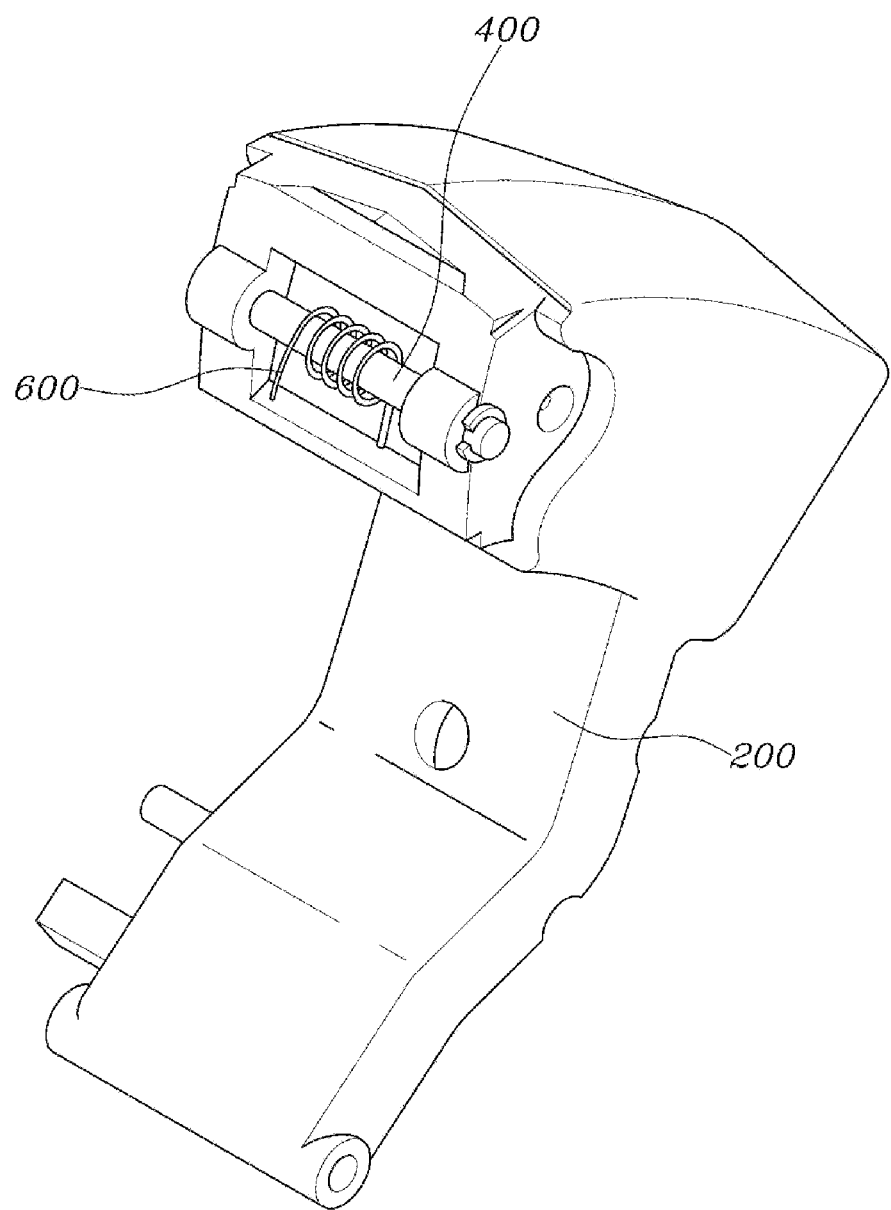
FIG. 5 is a view exemplarily illustrating a state in which a pedal pad in FIG. 3 is removed.
Figure 6:
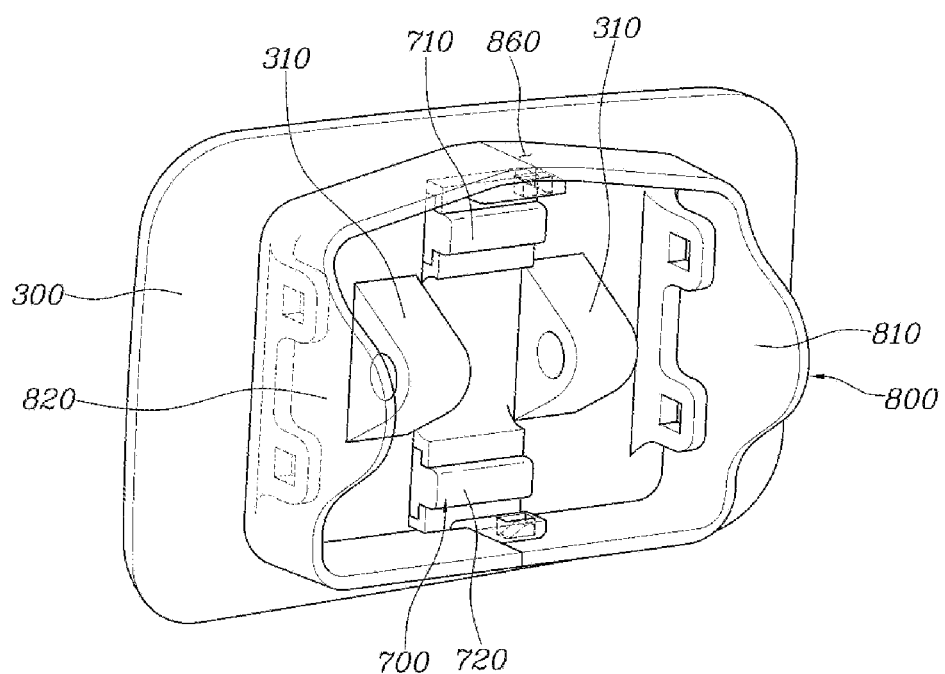
FIG. 6 is a rear view of the pedal pad according to an exemplary embodiment of the present disclosure.
Figure 7:
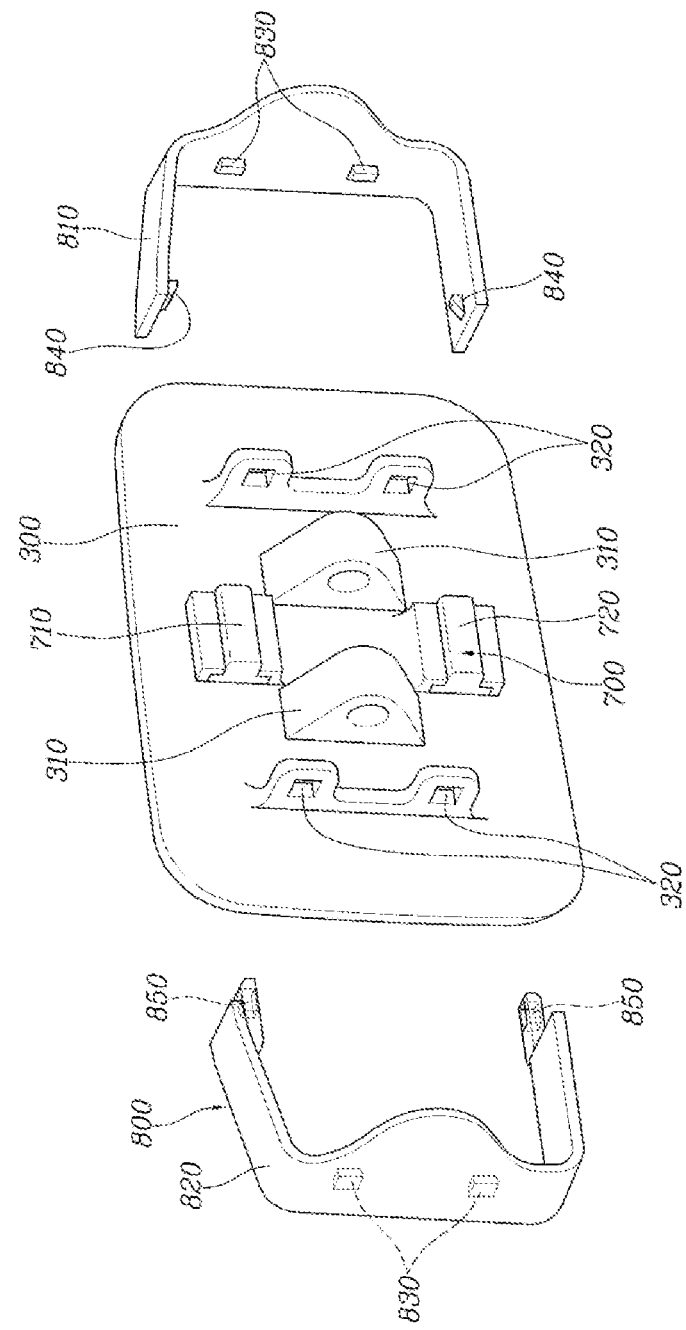
FIG. 7 is a view exemplarily illustrating that a pad cover in FIG. 6 is disassembled.
Figure 8:
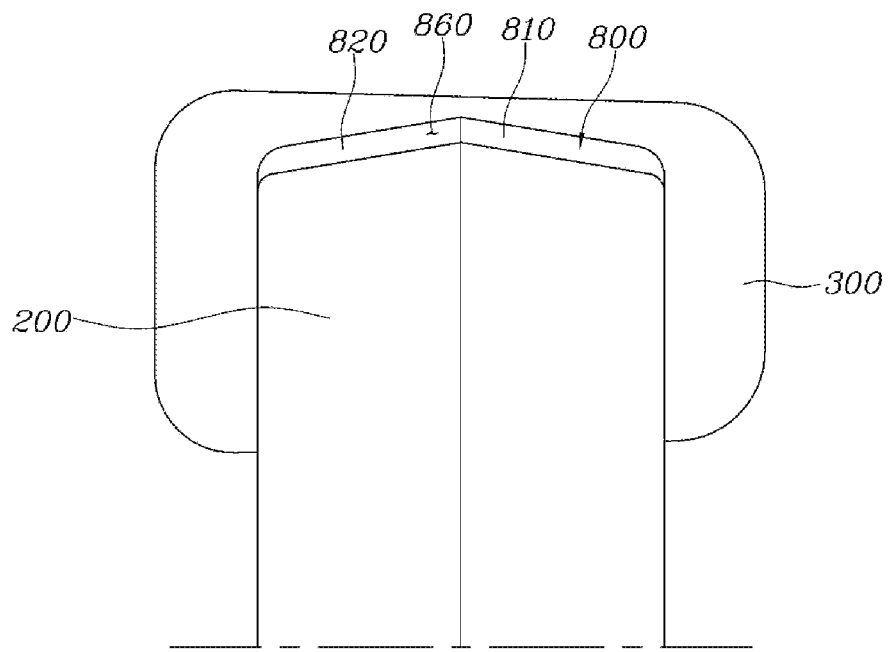
FIG. 8 is a view exemplarily illustrating a coupling portion between the pedal arm and the pedal pad when viewed from the rear side thereof.

As illustrated in FIG. 3, the pedal apparatus according to an exemplary embodiment of the present disclosure further includes a foldable mechanism 500 connected to the pedal arm 200.

The foldable mechanism 500 may include an actuator (motor) fixed on the pedal housing 100, and a gear member connecting the actuator and the pedal arm 200.

Figure 2:
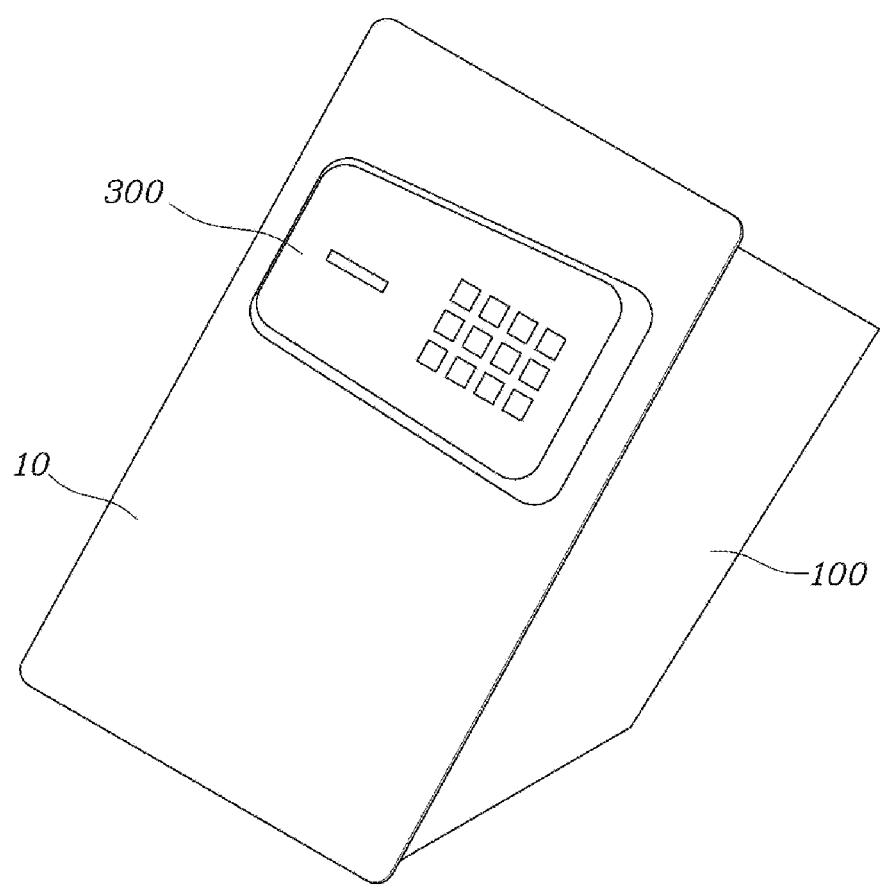
FIG. 2 is a view exemplarily illustrating a hidden state in which the pedal arm is inserted into the footrest panel.

The pedal arm 200 may switch, by operation of the foldable mechanism 500, between a pop-up state, in which the pedal arm 200 protrudes from the footrest panel 10, as illustrated in FIG. 1, so that the driver may operate the pedal arm 200 and a hidden state in which the pedal arm 200 is hidden by being inserted into the footrest panel 10, as illustrated in FIG. 2, so that the driver cannot operate the pedal arm 200.

The pedal apparatus according to an exemplary embodiment of the present disclosure further includes a pad spring 600 penetrated by the connection pin 400 and including two opposite end portions supported and provided on the pedal arm 200 and the pedal pad 300, the pad spring 600 being configured to provide a spring force to rotate the pedal pad 300 forward thereof.

The pad spring 600 may be configured as, but not limited to, a torsion spring.

The pad spring 600 provides the pedal pad 300 with appropriate tension, preventing a free movement of the pedal pad 300 and preventing the occurrence of noise caused by the free movement of the pedal pad 300.

The pedal apparatus according to an exemplary embodiment of the present disclosure further includes a damper 700 coupled to a rear surface of the pedal pad 300 and configured to come into contact with the pedal arm 200 when the pedal pad 300 rotates, preventing the occurrence of noise.

The damper 700 may be made of, but not limited to, a rubber material which is advantageous in absorbing impact and preventing noise.

The damper 700 is divided into an upper damper 710 and a lower damper 720 depending on a position of the damper 700 coupled to the rear surface of the pedal pad 300.

That is, two protrusion portions 310 are provided on the rear surface of the pedal pad 300 and spaced from each other in a leftward and rightward direction, and the connection pin 400 is provided to penetrate the two protrusion portions 310 in the leftward and rightward direction. The upper damper 710 and the lower damper 720 are fixedly coupled to upper and lower portions of the pedal pad 300 based on the protrusion portions 310.

The pedal apparatus according to an exemplary embodiment of the present disclosure further includes a pad cover 800 coupled to the rear surface of the pedal pad 300 and configured to prevent the connection pin 400, the fixing member 410, and the damper 700 from being exposed.

The pad cover 800 coupled to the pedal pad 300 covers the connection pin 400, the fixing member 410, and the damper 700 that are positioned at the connection portion between the pedal arm 200 and the pedal pad 300. Therefore, it is possible to improve an external aesthetic appearance. It is possible to prevent the pedal arm 200 from appearing to be thin, ensuring a robust image of the external appearance.

The pad cover 800 includes a left cover 810 and a right cover 820. The left and right covers 810 and 820 each have a plurality of cover protrusions 830.

Furthermore, coupling holes 320 are formed in the rear surface of the pedal pad 300 and respectively disposed at left and right sides of the protrusion portions 310. When the cover protrusions 830 are inserted into the coupling holes 320, the left and right covers 810 and 820 are coupled to the rear surface of the pedal pad 300.

Furthermore, the pad cover 800 has a structure in which the left and right covers 810 and 820 are assembled and connected to each other to ensure strength. To the present end, two opposite end portions of the left cover 810 and two opposite end portions of the right cover 820 are coupled to one another at the upper and lower portions of the pad cover 800 so that the connection structure may be implemented in the state in which the left and right covers 810 and 820 are coupled to the pedal pad 300. Furthermore, the coupling structure has a snap-fit structure, which makes it easy to assemble the pad cover 800.

The snap-fit coupling structure is a structure in which triangular protrusions 840 are fitted into holes 850 matched with the protrusions 840.

In the state in which the pad cover 800 is coupled to the pedal pad 300, an upper portion 860 of the pad cover 800 is formed to be inclined downward toward first and second opposite sides thereof from a middle point thereof.

That is, the upper portion 860 of the pad cover 800 is formed to have an inclined structure in which the middle point, at which the left and right covers 810 and 820 are coupled, is highest, and a height gradually decreases from the middle point toward the two opposite left and right sides. Therefore, it is possible to easily discharge foreign substances to the outside and prevent foreign substances from being introduced into the pedal housing 100.

Figure 9:
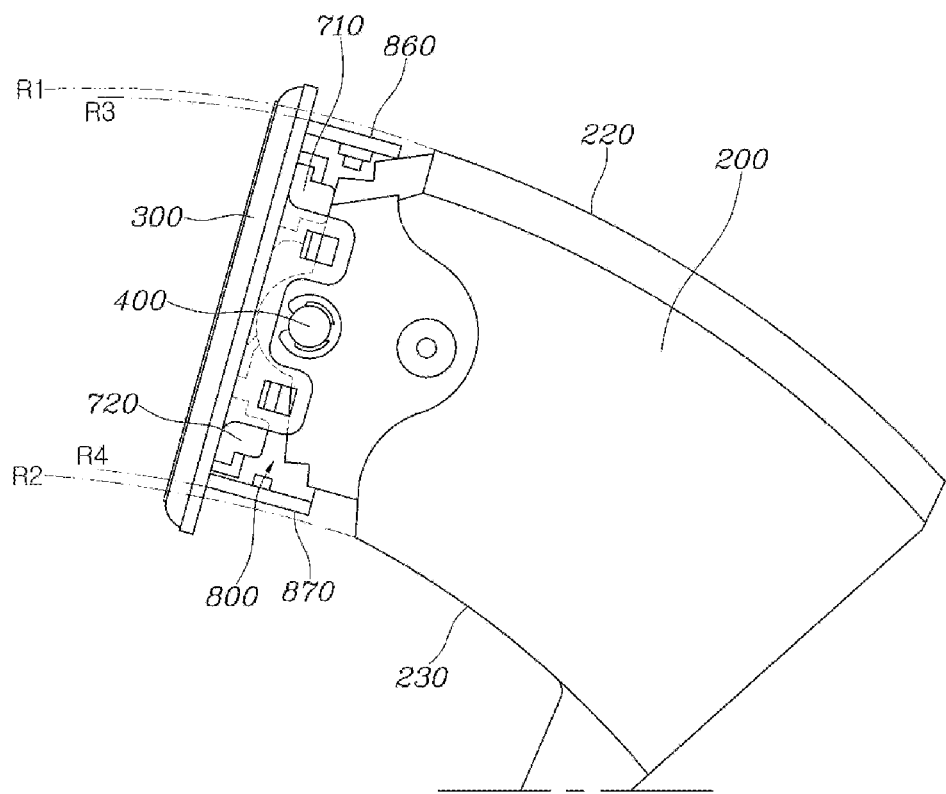
FIG. 9 is a view exemplarily illustrating the configuration in FIG. 8 when viewed from the lateral side thereof.

Referring to FIG. 9, in the state in which the pad cover 800 is coupled to the pedal pad 300, an upper surface 220 and a lower surface 230 of the pedal arm 200 and the upper portion 860 and a lower portion 870 of the pad cover 800 each have a curvature of an arc along a rotation radius of the pedal arm 200. In the instant case, the upper portion 860 of the pad cover 800 may have a smaller radius of curvature than the upper surface 220 of the pedal arm 200, and the lower portion 870 of the pad cover 800 may have a larger radius of curvature than the lower surface 230 of the pedal arm 200.

In FIG. 9, reference numeral R1 represents the radius of curvature of the upper surface 220 of the pedal arm 200, reference numeral R2 represents the radius of curvature of the lower surface 230 of the pedal arm 200, reference numeral R3 represents the radius of curvature of the upper portion 860 of the pad cover 800, and reference numeral R4 represents the radius of curvature of the lower portion 870 of the pad cover 800. R1 is greater than R3, and R4 is greater than R2.

As described above, the pedal apparatus according to an exemplary embodiment of the present disclosure is configured so that the pedal arm 200 may switch between the pop-up state and the hidden state by operation of the foldable mechanism 500. For the present reason, the operation of hiding the pedal arm 200 cannot be performed if the radii R3 and R4 of curvature of the upper and lower portions 860 and 870 of the pad cover 800 are respectively greater than the radii R1 and R2 of curvature of the upper and lower surfaces 220 and 230 of the pedal arm 200. Therefore, to smoothly perform the operation of hiding the pedal arm 200, R1 may be greater than R3, and R2 may be greater than R4.

Figure 10:
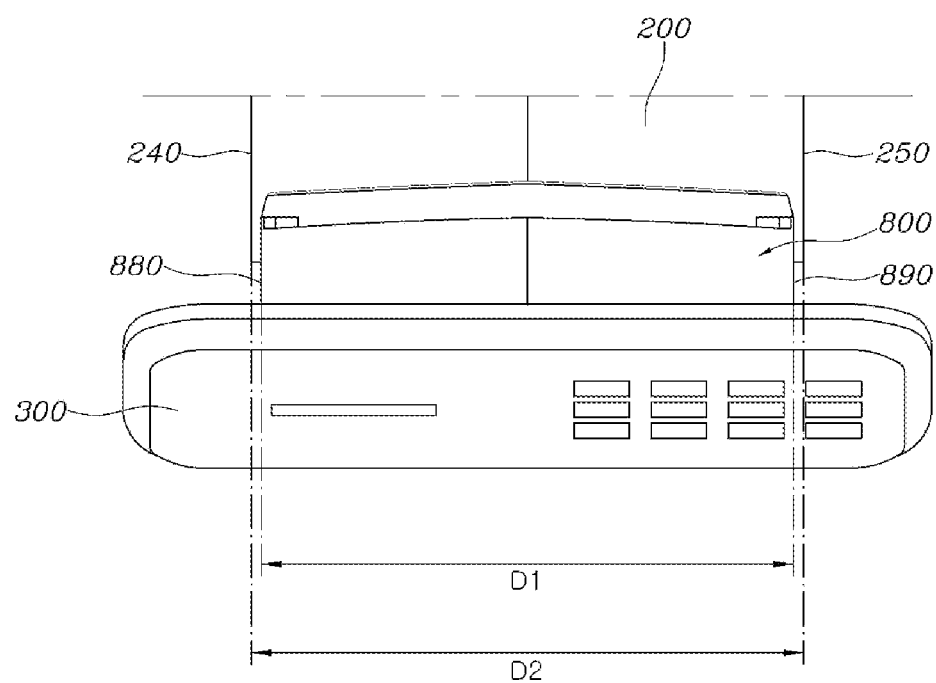
FIG. 10 is a view exemplarily illustrating the configuration in FIG. 8 when viewed from above.

Furthermore, referring to FIG. 10, in the state in which the pad cover 800 is coupled to the pedal pad 300, a width D1 of the pad cover 800 in the leftward and rightward direction may be smaller than a width D2 of the pedal arm 200 in the leftward and rightward direction thereof. Therefore, left and right surfaces 880 and 890 of the pad cover 800 may be respectively positioned inward of left and right surfaces 240 and 250 of the pedal arm 200. The present configuration may also satisfy the above-mentioned conditions to smoothly perform the operation of hiding the pedal arm 200.

Figure 11:
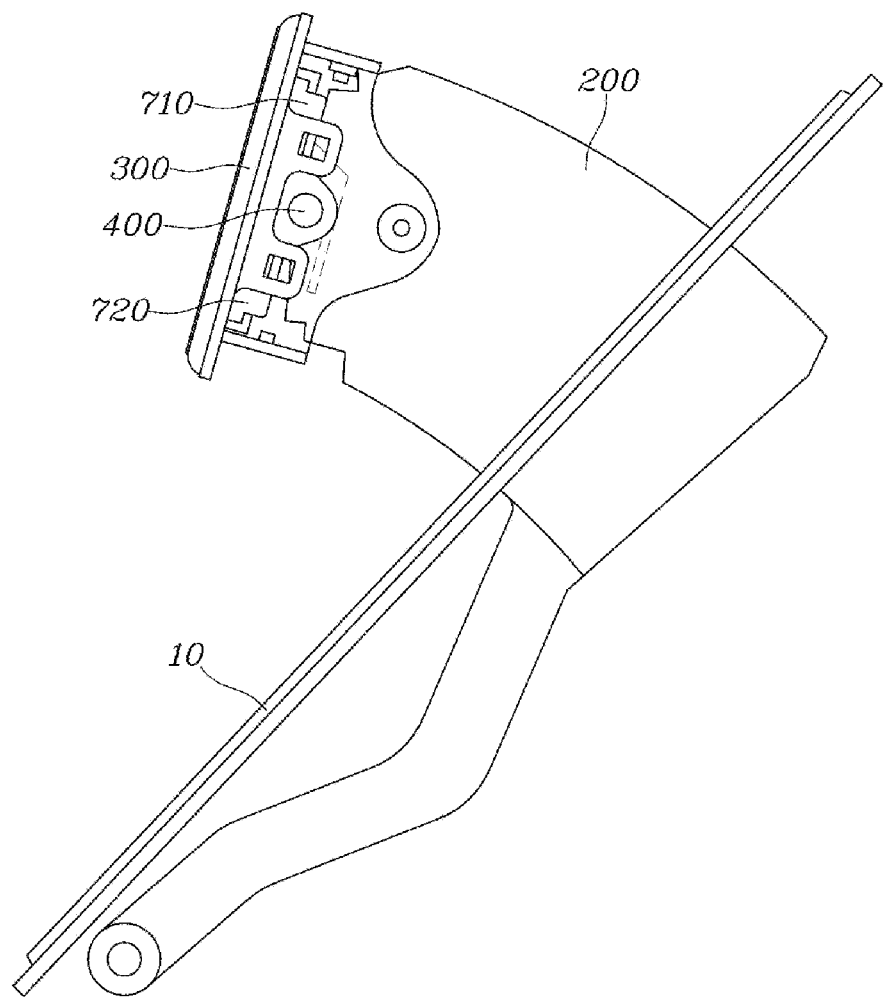
FIG. 11 is a view exemplarily illustrating an initial state in which a driver's foot is not in contact with the pedal pad in the pop-up state in which the pedal arm protrudes from the footrest panel.

FIG. 11 illustrates an initial state in which the driver's foot is not in contact with the pedal pad 300 in the pop-up state in which the pedal arm 200 protrudes from the footrest panel 10.

In the initial state, the pedal pad 300 is rotated forward about the connection pin 400 by the spring force of the pad spring 600. Therefore, the upper damper 710 is kept in contact with the pedal arm 200, and the lower damper 720 is kept spaced from the pedal arm 200.

Figure 12:
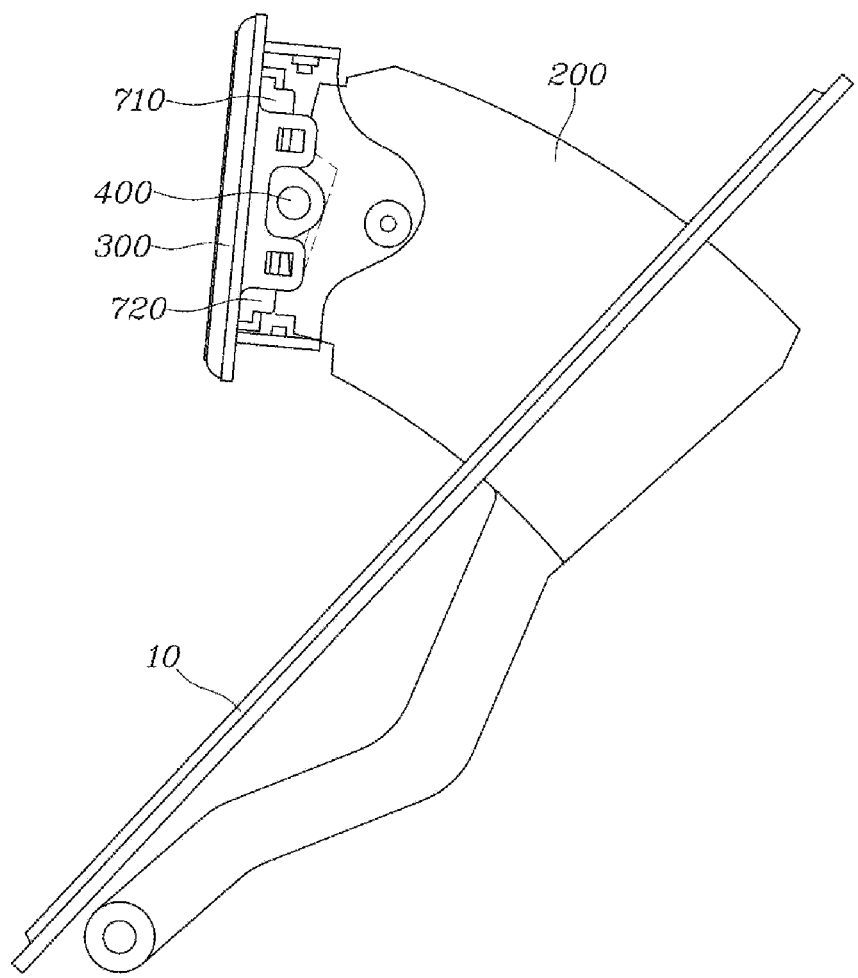
FIG. 12 is a view exemplarily illustrating a state in which the driver's foot is in contact with the pedal pad in the pop-up state in FIG. 11.

FIG. 12 illustrates a state in which the pedal arm 200 is popped up as illustrated in FIG. 11, and the driver's foot comes into contact with the pedal pad 300 and applies a load to the pedal pad 300.

When the driver's foot comes into contact with the pedal pad 300 in the state in which the pedal arm 200 is popped up, the pedal pad 300 rotates rearward about the connection pin 400 along a trajectory of the driver's foot. When the pedal pad 300 is maximally rotated rearward thereof, the lower damper 720 is kept in contact with the pedal arm 200, and the upper damper 710 is kept spaced from the pedal arm 200, as illustrated in FIG. 12.

Figure 13:
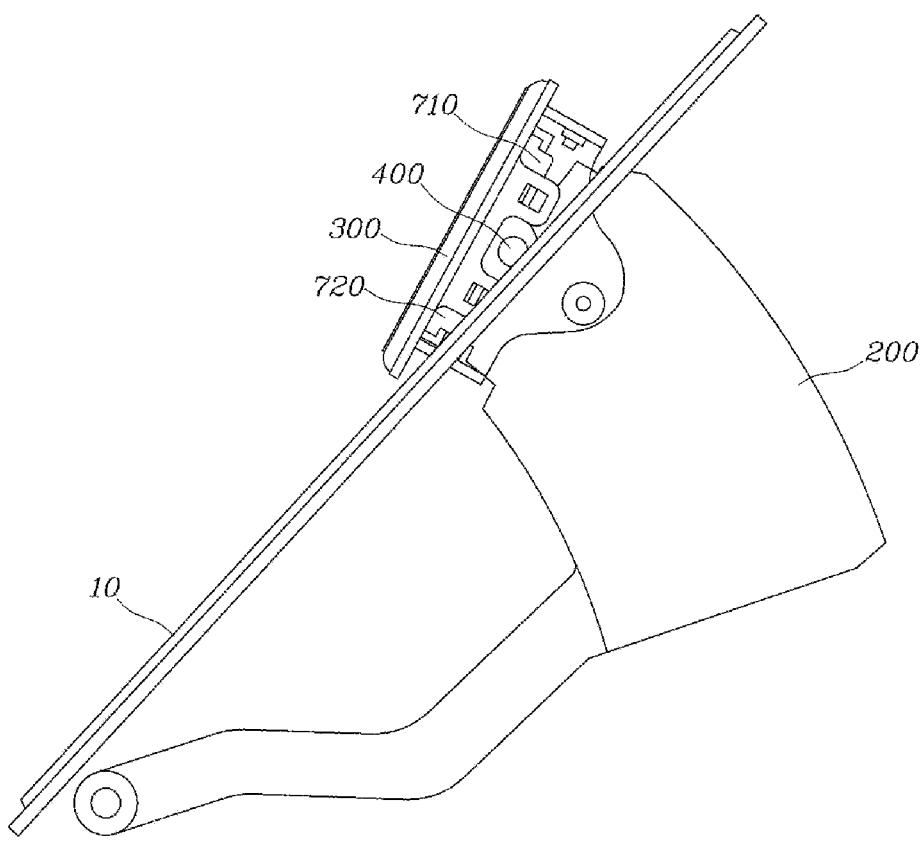
FIG. 13 is a view exemplarily illustrating a state in which the pedal arm is rotated forward with a full stroke by operation of the driver from the state in FIG. 12.

FIG. 13 illustrates a state in which the pedal arm 200 is rotated forward with a full stroke by operation of the driver from the state in FIG. 12.

When the pedal pad 300, which is in contact with the driver's foot, rotates about the connection pin 400 in the state in which the pedal arm 200 is rotated with a full stroke, the lower damper 720 comes into contact with the pedal arm 200, and the pedal pad 300 does not come into contact with the footrest panel 10. Therefore, an ankle angle of the driver pressing the pedal pad 300 may be kept in a comfortable state.

For example, the stroke may be designed so that a full stroke (e.g., 70 mm) of the pedal arm 200 made by operation of the driver is relatively smaller than a stroke (e.g., 80 mm) of the pedal arm 200 when the pedal arm 200 switches to the hidden state so that the pedal pad 300 does not come into contact with the footrest panel 10 when the pedal pad 300 rotates in a full stroke state of the pedal arm 200.

For reference, a stopper may be provided in the pedal housing 100, and a position of the stopper may be moved when the pedal arm 200 switches to the pop-up state or the hidden state. Therefore, the full stroke of the pedal arm 200 made by operation of the driver may be designed to be relatively smaller than the stroke of the pedal arm 200 when the pedal arm 200 switches to the hidden state. Therefore, the pedal apparatus may be designed so that the pedal pad 300 does not come into contact with the footrest panel 10 when the pedal pad 300 rotates in the full stroke state of the pedal arm 200.

Figure 14:
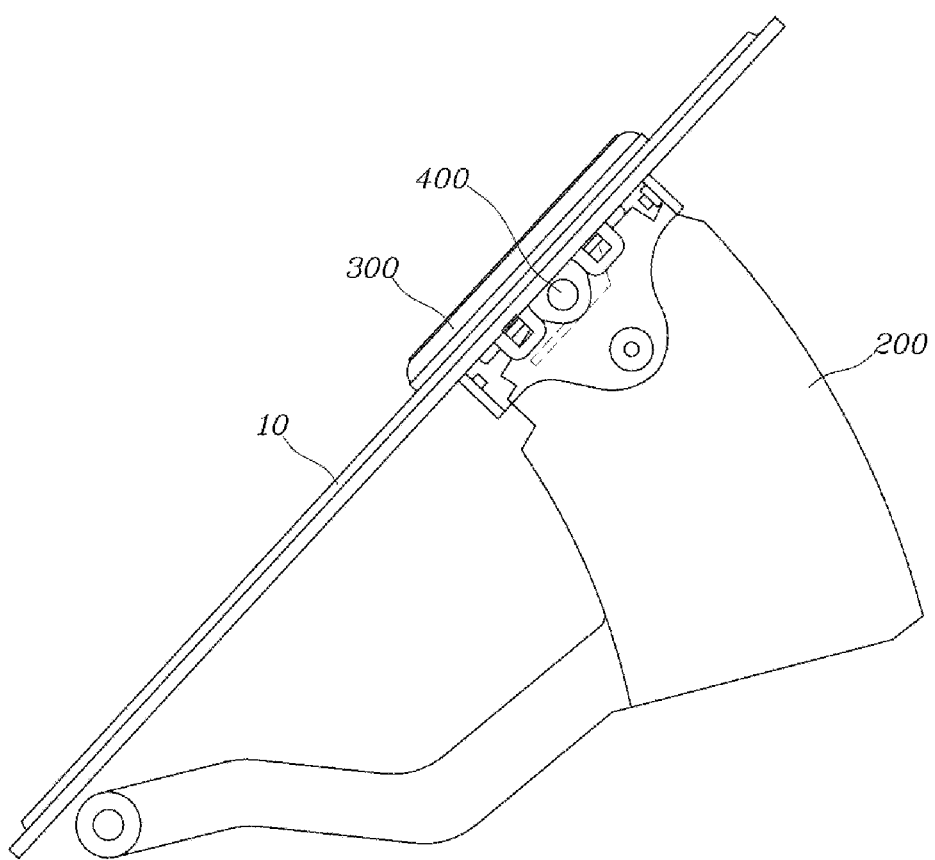
FIG. 14 is a view exemplarily illustrating a hidden state in which the pedal arm is inserted into the footrest panel by operation of a foldable mechanism.

FIG. 14 illustrates the hidden state in which the pedal arm 200 is inserted into the footrest panel 10 by operation of the foldable mechanism 500.

When the pedal arm 200 is in the hidden state, the rear surface of the pedal pad 300 is in surface-contact with the footrest panel 10 and blocks a hole in the footrest panel 10 through which the pedal arm 200 passes, which makes it possible to prevent the introduction of foreign substances.

When the pedal pad 300 comes into contact with the footrest panel 10 during the operation of hiding the pedal arm 200, the pedal pad 300 may rotate about the connection pin 400 so that the pedal pad 300 may absorb tolerance of a contact surface with the footrest panel 10. Therefore, accurate surface-contact between the rear surface of the pedal pad 300 and the footrest panel 10 may be implemented, which makes it possible to improve an effect of preventing introduction of foreign substances and maintaining smooth design of a matching surface.

Furthermore, when the pedal arm 200 is in the hidden state, the lower damper 720 is spaced from the pedal arm 200 without being in contact with the pedal arm 200, and the upper damper 710 may be in contact with or spaced from the pedal arm 200 depending on an angle of the footrest panel 10.

As described above, the pedal apparatus for a vehicle according to an exemplary embodiment of the present disclosure is an organ-type pedal apparatus, in which the pedal pad 300 is rotatably coupled to the upper end portion of the foldable pedal arm 200. Therefore, the contact area may be increased when the driver's foot comes into contact with the pedal pad 300, which makes it possible to improve convenience and safety for the driver when the driver performs the pedal operation.

Furthermore, according to the pedal apparatus for a vehicle according to an exemplary embodiment of the present disclosure, the pad cover 800 may be coupled to the connection portion between the pedal arm 200 and the pedal pad 300, and the pad cover 800 may be used to cover the coupling components of the pedal arm 200 and the pedal pad 300, which makes it possible to improve the external aesthetic appearance, it is possible to prevent the pad cover 800 from causing the problem in that the pedal arm 200 appears to be thin, which makes it possible to ensure a robust image of the external appearance.

Furthermore, according to the pedal apparatus for a vehicle according to an exemplary embodiment of the present disclosure, the upper portion 860 of the pad cover 800 is inclined downward toward the two opposite sides thereof from the middle point thereof. Therefore, it is possible to easily discharge foreign substances to the outside and thus prevent foreign substances from being introduced into the pedal housing 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pedal apparatus for a vehicle, the pedal apparatus comprising:
   a pedal arm including an upper end portion configured to be rotatable forward or rearward about a hinge pin mounted at a lower end portion of the pedal arm;
   a pedal pad rotatably coupled to the pedal arm; and
   a foldable mechanism connected to the pedal arm,
   wherein the pedal arm is configured to switch between a pop-up state, in which the pedal arm protrudes from a footrest panel by operation of the foldable mechanism, and a hidden state in which the pedal arm is inserted into the footrest panel.

2. The pedal apparatus of claim 1, further including:
   a connection pin disposed at the upper end portion of the pedal arm and connecting the pedal arm and the pedal pad,
   wherein the pedal pad rotates forward or rearward about the connection pin relative to the pedal arm.

3. The pedal apparatus of claim 2, further including:
   a pad spring penetrated by the connection pin and including first and second opposite end portions supported and provided on the pedal arm and the pedal pad, the pad spring being configured to provide a spring force to rotate the pedal pad forward thereof.

4. The pedal apparatus of claim 1, further including:
   a damper coupled to a rear surface of the pedal pad and configured to prevent occurrence of noise by coming into contact with the pedal arm when the pedal pad rotates.

5. The pedal apparatus of claim 4, wherein a protrusion portion is provided on the rear surface of the pedal pad and penetrated by the connection pin.

6. The pedal apparatus of claim 5, wherein the damper includes upper and lower dampers coupled to upper and lower portions of the pedal pad based on the protrusion portion.

7. The pedal apparatus of claim 4, further including:
a connection pin disposed at the upper end portion of the pedal arm and connecting the pedal arm and the pedal pad;
a fixing member coupled to an end portion of the connection pin and configured to prevent withdrawal of the connection pin from the pedal arm and the pedal pad; and
a pad cover coupled to the rear surface of the pedal pad to prevent the connection pin, the fixing member, and the damper from being exposed from the pad cover.

8. The pedal apparatus of claim 7, wherein the pad cover includes a left cover and a right cover, the left and right covers each have a cover protrusion, and the cover protrusion is inserted into a coupling hole formed in the pedal pad so that the left and right covers are coupled to the rear surface of the pedal pad.

9. The pedal apparatus of claim 8, wherein first and second opposite end portions of the left cover and first and second opposite end portions of the right cover are coupled to one another at upper and lower portions of the pad cover so that a connection structure is implemented in a state in which the left and right covers are coupled to the pedal pad.

10. The pedal apparatus of claim 7, wherein an upper portion of the pad cover is inclined downward toward first and second opposite sides thereof from a middle point thereof.

11. The pedal apparatus of claim 7,
wherein upper and lower surfaces of the pedal arm and upper and lower portions of the pad cover each have a curvature of an arc along a rotation radius of the pedal arm, and
wherein the upper portion of the pad cover has a smaller radius of curvature than the upper surface of the pedal arm, and the lower portion of the pad cover has a larger radius of curvature than the lower surface of the pedal arm.

12. The pedal apparatus of claim 7, wherein a width of the pad cover in a leftward and rightward direction is smaller than a width of the pedal arm in the leftward and rightward direction, and left and right surfaces of the pad cover is respectively positioned inwardly of left and right surfaces of the pedal arm.

13. The pedal apparatus of claim 6, wherein in a state in which a driver's foot is not in contact with the pedal pad in a state in which the pedal arm is popped up, the pedal pad is rotated forward by a spring force of a pad spring, the upper damper is in contact with the pedal arm, and the lower damper is kept spaced from the pedal arm.

14. The pedal apparatus of claim 6, wherein in a response that a driver's foot comes into contact with the pedal pad in a state in which the pedal arm is popped up, the pedal pad rotates rearward about a connection pin disposed at the upper end portion of the pedal arm and connecting the pedal arm and the pedal pad, and
wherein when the pedal pad maximally rotates rearward thereof, the lower damper comes into contact with the pedal arm, and the upper damper is kept spaced from the pedal arm.

15. The pedal apparatus of claim 6, wherein when the pedal pad, which is in contact with a driver's foot, rotates about a connection pin disposed at the upper end portion of the pedal arm and connecting the pedal arm and the pedal pad in a state in which the pedal arm is rotated forward with a full stroke, the lower damper comes into contact with the pedal arm, and the pedal pad does not come into contact with the footrest panel.

16. The pedal apparatus of claim 1, wherein when the pedal arm is in a hidden state, a rear surface of the pedal pad is in surface-contact with the footrest panel and blocks a hole of the footrest panel through which the pedal arm passes.

17. The pedal apparatus of claim 6, wherein when the pedal arm is in a hidden state, a rear surface of the pedal pad is in surface-contact with the footrest panel, and the lower damper is spaced from the pedal arm.

18. The pedal apparatus of claim 1, wherein the foldable mechanism includes:
an actuator fixed on a pedal housing; and
a gear member engaged to the actuator and the pedal arm.

19. A pedal apparatus for a vehicle, the pedal apparatus comprising:
a pedal arm including an upper end portion configured to be rotatable forward or rearward about a hinge pin mounted at a lower end portion of the pedal arm;
a pedal pad rotatably coupled to the pedal arm; and
a damper coupled to a rear surface of the pedal pad and configured to prevent occurrence of noise by coming into contact with the pedal arm when the pedal pad rotates.

* * * * *